UNITED STATES PATENT OFFICE.

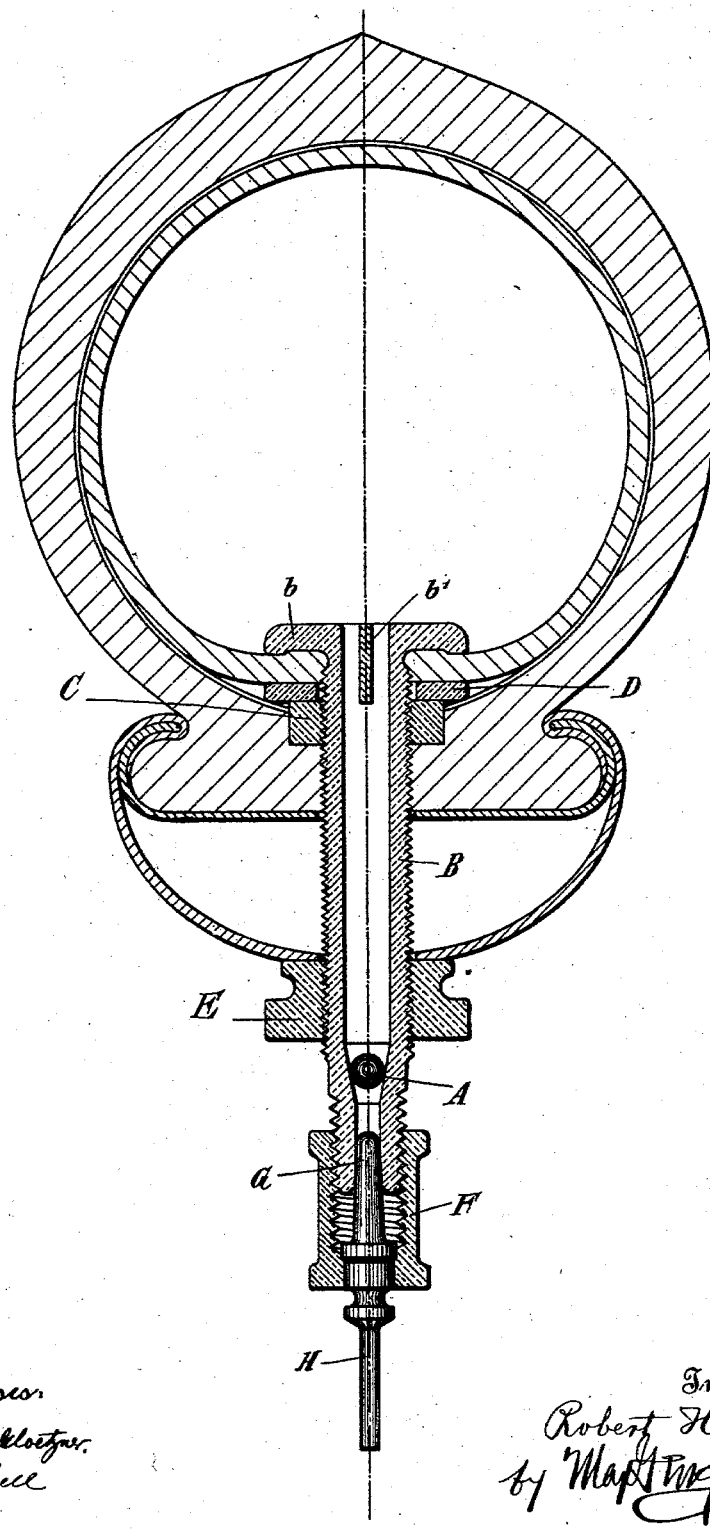

ROBERT HONOLD, OF STUTTGART, GERMANY.

BICYCLE-TIRE VALVE.

SPECIFICATION forming part of Letters Patent No. 634,752, dated October 10, 1899.

Application filed March 25, 1898. Serial No. 675,145. (No model.)

*To all whom it may concern:*

Be it known that I, ROBERT HONOLD, a citizen of the Kingdom of Würtemberg, residing at Militarstrasse No. 6, Stuttgart, Kingdom of Würtemberg, Germany, have invented certain new and useful Improvements in Valves for Pneumatic Tires; and I do hereby declare the following to be a full, clear, and exact description of the invention, such as will enable others skilled in the art to which it appertains to make and use the same.

My invention relates to improvements in valves, and particularly to a valve especially adapted for use in connection with pneumatic tires for bicycles and the like.

The object of my invention is to provide a valve which will be exceedingly simple in construction and durable and which in addition will render leakage of the compressed air through the valve practically impossible.

A further object of my invention is to provide means by which the usual dust-cap will be removably held in place in a firmer manner than usual.

With these objects in view my invention consists in the features, details of construction, and combination of parts, which will first be described in connection with the accompanying drawings and then particularly pointed out in the claim.

The drawing is a sectional view taken longitudinally through the valve and transversely through the tire and wheel-rim.

Referring to the drawing, B is a valve-casing having a flange $b$ at its inner end and a slightly-conical contracted opening at its outer end, the said contracted opening being connected with the larger inner diameter of the valve-casing by means of an interior conical valve-seat, the purpose of which will be hereinafter pointed out.

The exterior of the valve-casing is circular in cross-section and threaded, as shown, to receive an inner nut C and an outer nut E.

The said valve-casing is inserted through openings in the tire and wheel-rim in a well-known manner, the tire and wheel-rim being clamped firmly by screwing up the inner and outer nuts C and E, a collar D being inserted between the tire and the inner collar C in order to compress the elastic tire firmly around the valve-casing, and thereby prevent leakage around the valve-casing.

Within the valve-casing is placed a metal ball-valve A, preferably of steel, which is of such a diameter that it will fit air-tight into the coned portion or valve-seat, being normally held in this position when the tire is inflated by the pressure of the air in the tire and being lifted from its seat back into the larger diameter of the interior of the valve-casing when the pump which is used to inflate the tire is driving the air inward to the tire.

The outer end of the valve-casing is somewhat reduced in diameter and screw-threaded to receive the pump connection and also to receive a dust-cap F. This dust-cap has a centrally-arranged plug projecting inward and arranged to enter a substantial distance into the outer reduced end of the valve-casing, the said projecting end of the plug being slightly coned, as shown at G, in order to fit air-tight into the outer end of the casing. The outer end of the plug is extended some distance beyond the dust-cap and formed as a stem or needle of such diameter that it will freely enter the outer end of the valve-casing and can be used to push the ball-valve A from its seat in order to deflate the tire.

By my construction the ball-valve A is relied upon only during the time that the pump is in use to inflate the tire. When this has been done, the dust-cap is screwed in place, and its coned plug serves as an additional valve to close the outer end of the tire, so that even if the ball-valve should be inclined to leak from any cause no air can escape from the valve. Moreover, since the dust-cap is held against unscrewing not only by the friction of its screw-threads, but also by the friction of the plug in the outer end of the valve-casing, the danger of the said dust-cap accidentally unscrewing is reduced to a minimum.

In order to prevent the ball-valve from escaping from the casing at the inner end of the casing, a stop device or transverse bar $b'$ is provided at such inner end.

I am aware that it is old to construct air-valves with a conical stud in the form of a valve which closes the end of the valve-casing; but my invention differs from these constructions in that I employ a plug instead of a stud, said plug being but slightly smaller at its inner end than at its outer end and of such length that it will enter a substantial distance into the opening in the end of the valve-casing, whereby said plug when pushed into the casing with some force, as by screwing down the dust-cap, acts as a wedge, thereby bringing into action the elasticity of the metal of the valve-casing, which reacts to hold the plug firmly, so that the friction and elasticity together will prevent the plug from being forced out by the pressure of the air in the tire if the ball-valve should accidentally become unseated.

It is common to construct air-valves of this general type; but one of the disadvantages of the same has been that the dust-cap frequently works loose simply from the motion the device receives in use, and particularly when the bicycle or other vehicle is subjected to excessive jolting or shocks in traveling over rough or uneven road-beds. In the latter case the valve-casing is subjected to excessive vibration, and consequently the dust-cap tends to unscrew from the end of the casing to which it is attached. In order to overcome this tendency, I preferably construct the coned plug-valve with the end of the same even or substantially flush with the open end of the screw-cap, so that the sides of the valve-casing are clamped or received snugly all around between the said plug-valve and the inner sides of the cap, as well as for an equal distance longitudinally of the valve-casing. In this way the effects of vibration are destroyed and the screw-cap remains in place with but little, if any, tendency to unscrew from the end of the valve-casing. Preferably, also, I make both the screw-cap and plug-valve of such length that they will respectively embrace and enter the valve-casing a substantial distance, and the taper of both the valve and that part of the passage which it enters is comparatively slight. With this class of valves as hitherto constructed it has been common heretofore to construct the coned plug-valve of a height or length to extend beyond the open end of the screw-cap, and in other instances to construct the valve shorter or with its end below the end of the casing. Neither of these forms, however, overcomes the tendency of the dust-cap to loosen from the causes above mentioned.

Having thus fully described my invention, what I claim as new, and desire to secure by Letters Patent of the United States, is—

In a valve of the class described, the combination, with a valve-casing having a valve-seat, and a ball-valve movable within the casing and arranged to rest on the valve-seat, of a removable dust-cap embracing the outer end of the valve-casing and provided interiorly with a slightly-conical plug-valve entering a substantial distance into a correspondingly-coned portion of the main passage in the casing, substantially as shown and for the purpose described.

In testimony whereof I affix my signature in presence of two witnesses.

ROBERT HONOLD.

Witnesses:
AUGUST B. DRAERTZ,
N. WAGNER.